Figure 1:
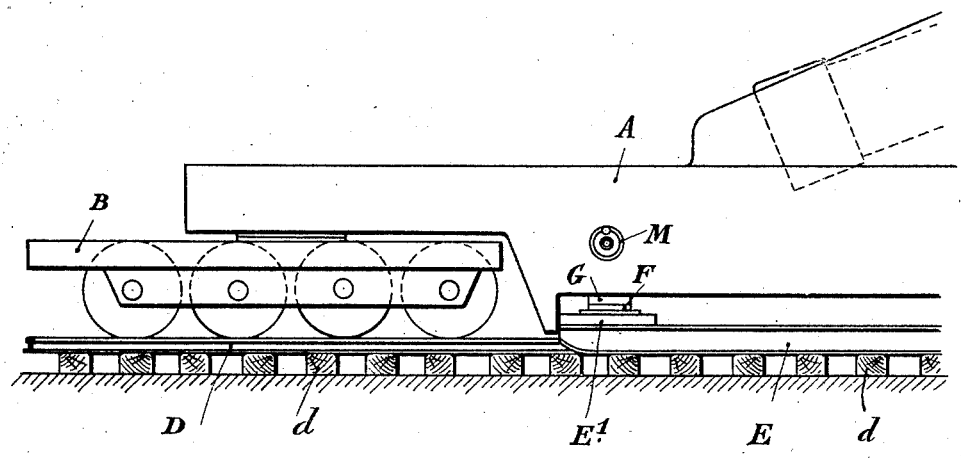

E. SCHNEIDER.
CARRIAGE OF LARGE CALIBER GUNS FIRING FROM RAILWAY TRACKS.
APPLICATION FILED JUNE 16, 1919.

1,349,533.

Patented Aug. 10, 1920.
6 SHEETS—SHEET 1.

Inventor:—
Eugene Schneider,
By Mauro, Cameron, Lewis & Massie
Attorneys.

E. SCHNEIDER.
CARRIAGE OF LARGE CALIBER GUNS FIRING FROM RAILWAY TRACKS.
APPLICATION FILED JUNE 16, 1919.
1,349,533.
Patented Aug. 10, 1920.
6 SHEETS—SHEET 2.
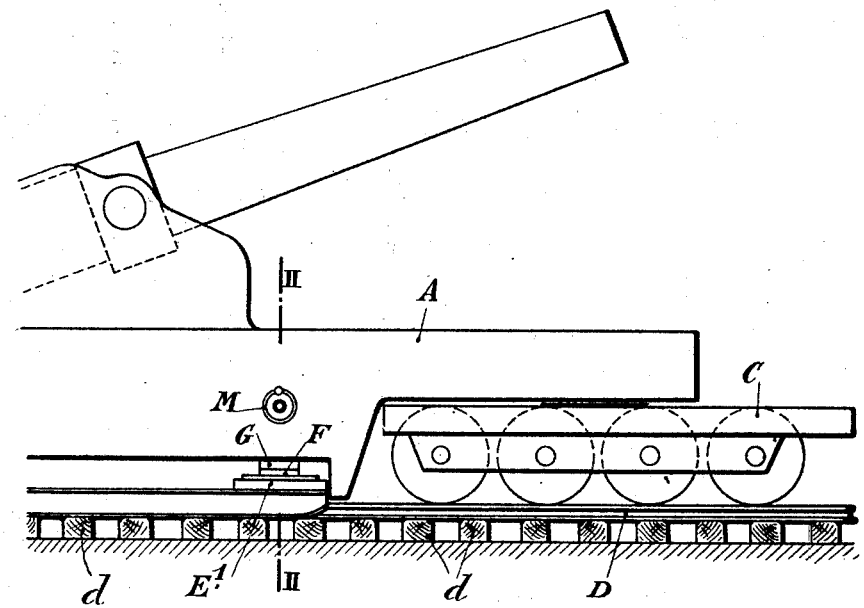
*Fig. 1.ª*
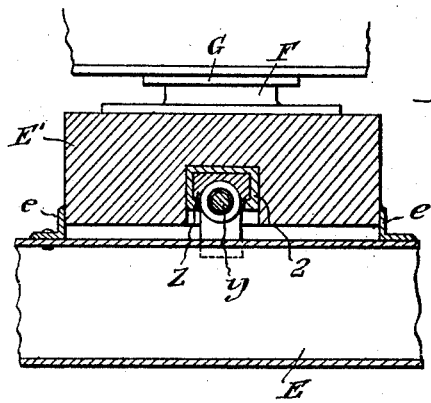
*Fig. 6.*
Inventor:—
Eugene Schneider
By Mauro, Cameron, Lewis & Massie
Attorneys.

E. SCHNEIDER.
CARRIAGE OF LARGE CALIBER GUNS FIRING FROM RAILWAY TRACKS.
APPLICATION FILED JUNE 16, 1919.

1,349,533.

Patented Aug. 10, 1920.
6 SHEETS—SHEET 3.

E. SCHNEIDER.
CARRIAGE OF LARGE CALIBER GUNS FIRING FROM RAILWAY TRACKS.
APPLICATION FILED JUNE 16, 1919.
1,349,533.
Patented Aug. 10, 1920.
6 SHEETS—SHEET 4.
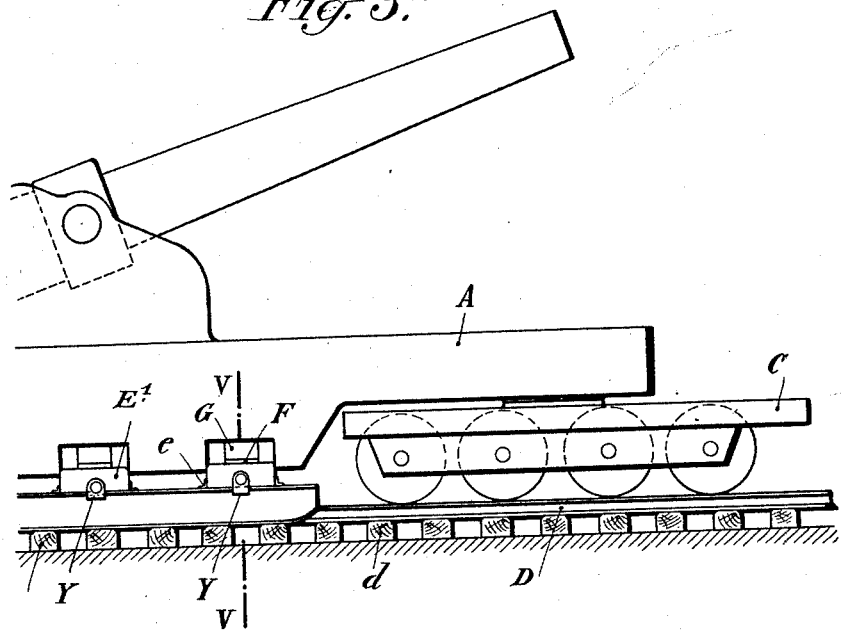
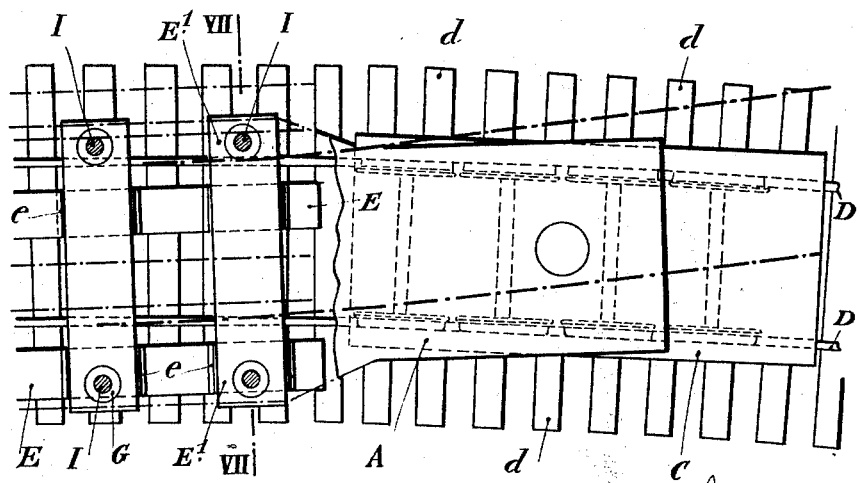

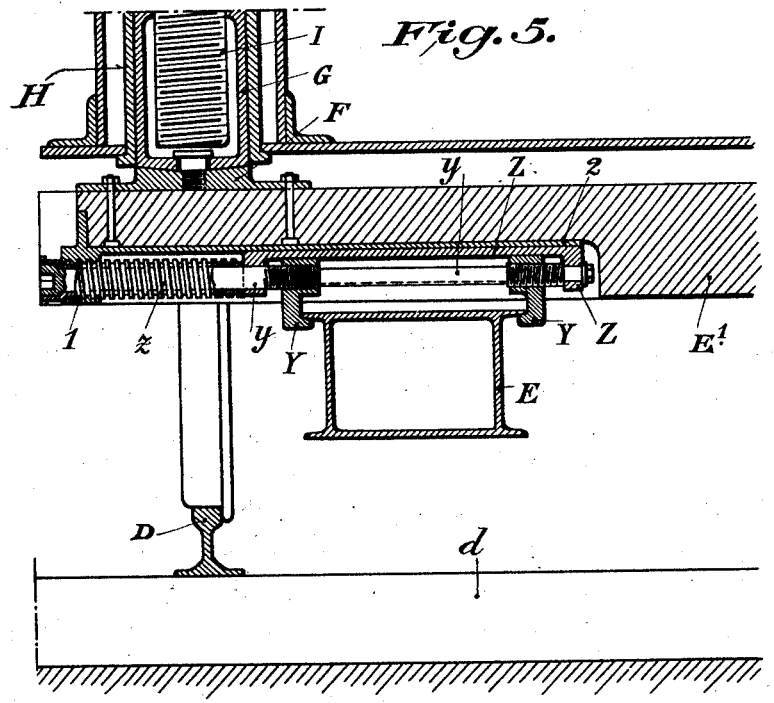
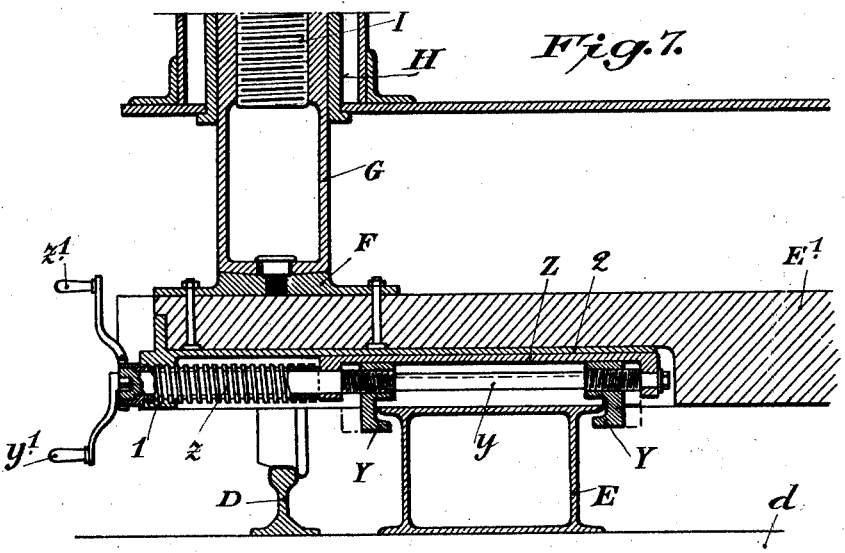

E. SCHNEIDER.
CARRIAGE OF LARGE CALIBER GUNS FIRING FROM RAILWAY TRACKS.
APPLICATION FILED JUNE 16, 1919.
1,349,533.
Patented Aug. 10, 1920.
6 SHEETS—SHEET 6.
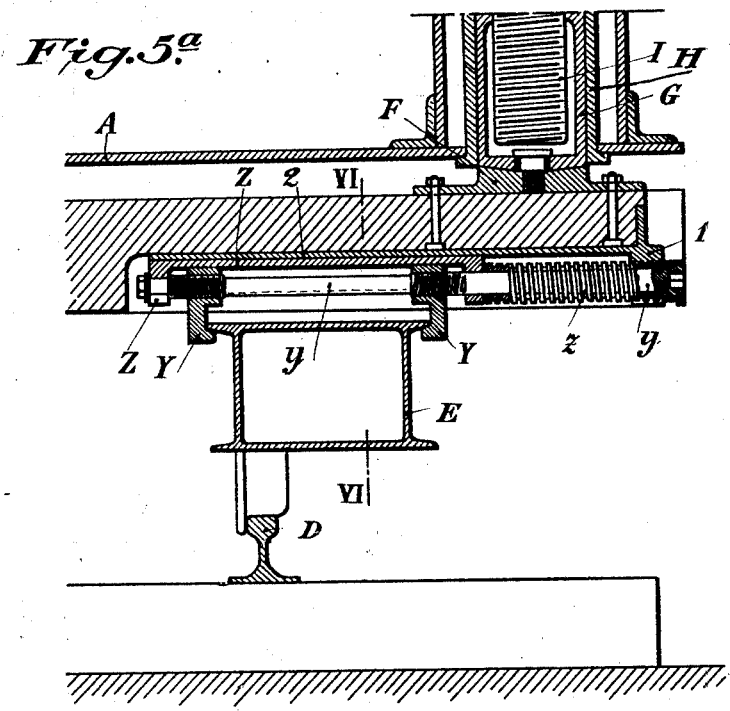
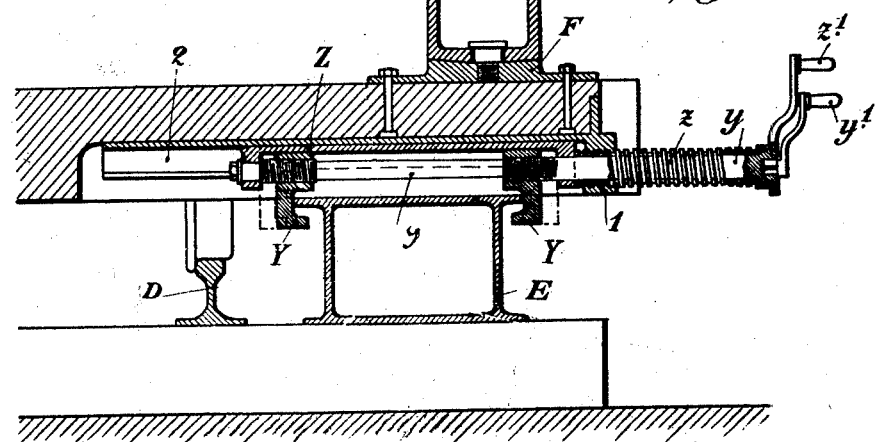

UNITED STATES PATENT OFFICE.

EUGÈNE SCHNEIDER, OF PARIS, FRANCE, ASSIGNOR TO SCHNEIDER & CIE., OF PARIS, FRANCE, A LIMITED JOINT-STOCK COMPANY OF FRANCE.

CARRIAGE OF LARGE-CALIBER GUNS FIRING FROM RAILWAY-TRACKS.

1,349,533. Specification of Letters Patent. Patented Aug. 10, 1920.

Application filed June 16, 1919. Serial No. 304,649.

*To all whom it may concern:*

Be it known that I, EUGÈNE SCHNEIDER, a citizen of the Republic of France, residing at 42 Rue d'Anjou, Paris, France, have invented new and useful Improvements in the Carriages of Large-Caliber Guns Firing from Railway-Tracks, which invention is fully set forth in the following specification.

This invention has for its object to provide various constructional forms of apparatus designed to moderate the effects of the recoil of the carriages of large-caliber guns mounted on trucks for firing from a railway track as described in our earlier Patent No. 1,326,788, dated Dec. 30, 1919.

In accordance with the present invention the retractable supporting devices designed to be brought into contact with the track for the purpose of braking the recoil by sliding along the said track, are composed of elongated longitudinal sliding blocks or shoes. These longitudinal sliding blocks, instead of being brought into contact with the ordinary track rails, or with auxiliary rails, are brought into contact with the sleepers of the permanent way.

In the recoil, the gun carriage rolls over the ordinary track rails, whereas the brake shoes when brought into contact with the track sleepers, slide on the said sleepers to which they transmit the strains due to the firing and thereby relieve the truck wheels and axles of such forces.

This improved construction has the advantage that it does away with the necessity of providing an auxiliary slide track, without the sliding having to take place along the rails of the ordinary track.

Two constructional forms of the present invention are illustrated by way of example in the accompanying drawings in which:—

Complementary Figures 1 and 1ª are a side elevation of the general arrangement of a gun carriage firing from a railway track, provided with the improved apparatus for moderating the effects of the recoil.

Figure 2:
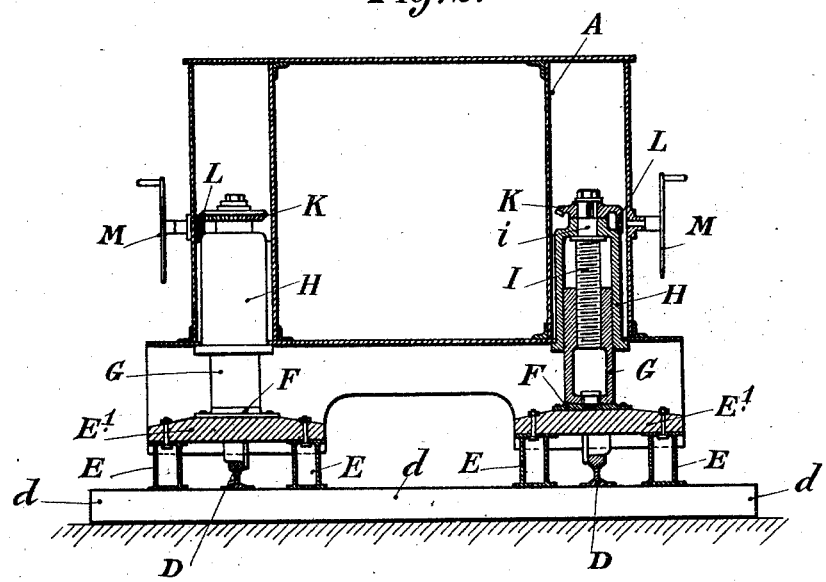

Fig. 2 is a vertical cross section on the line II—II of Fig. 1ª, drawn to a larger scale.

Figure 3:
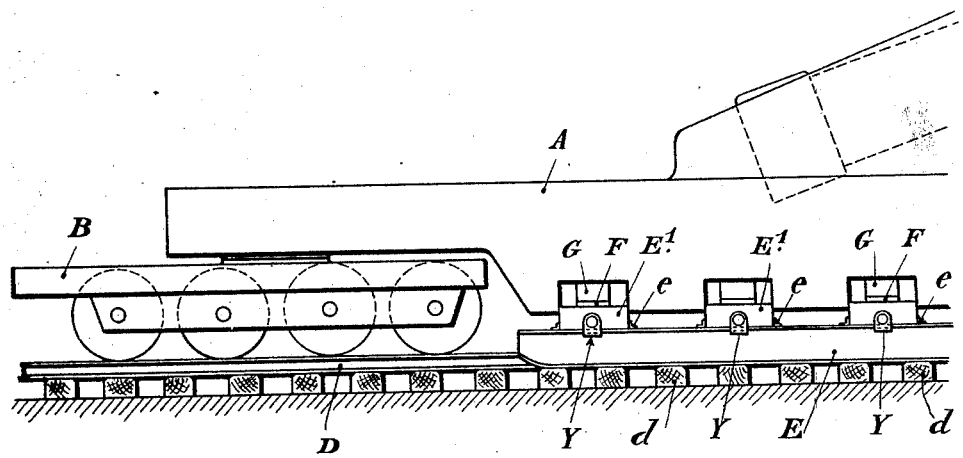

Complementary Figs. 3 and 3ª are a diagrammatic side elevation of the general arrangement of a gun carriage embodying a modification of the improvement.

Figure 4:
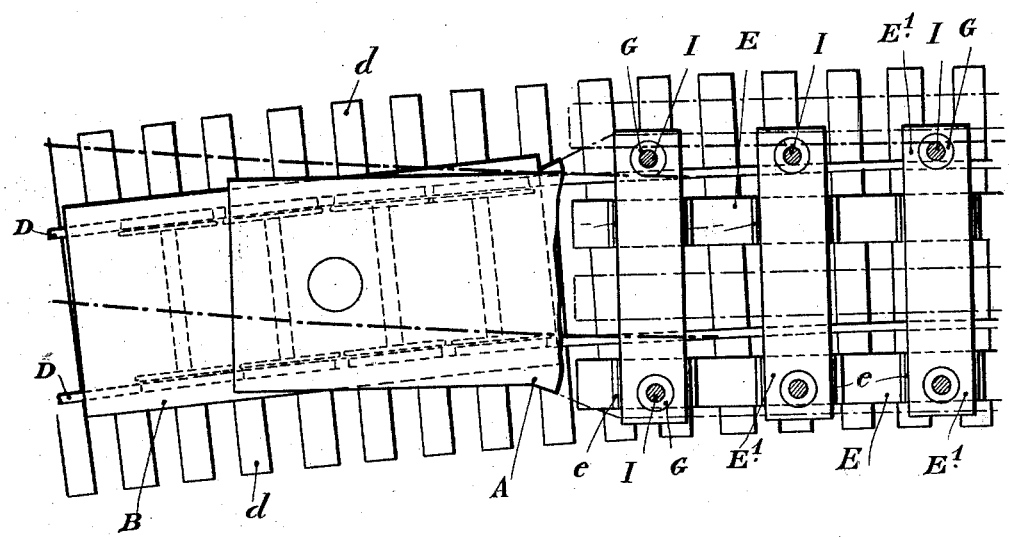

Complementary Figs. 4 and 4ª are a plan view of the same.

Complementary Figs. 5 and 5ª are a vertical cross-section on the line V—V of Fig. 3ª, showing the shoes in raised position.

Fig. 6 is a partial section on the line VI—VI of Fig. 5.

Complementary Figs. 7 and 7ª are a vertical cross-section on the line VII—VII of Fig. 4ª, the same as Fig. 5, but showing the sliding shoes in the position they occupy during firing.

Referring particularly to Figs. 1, 1ª and 2, A is the carriage girder supported at each end on a truck B, C, pivoted thereto. This girder A carries permanently longitudinal slide blocks or shoes E that are adapted to be brought into and out of contact with the sleepers $d$ on which rest the rails D of the ordinary track.

The longitudinal slide blocks or shoes E form the retractable supporting devices that are designed to slide, during the recoil, over the slideway constituted by the upper surfaces of the ordinary track sleepers $d$. The shoes extend longitudinally beneath the main part of the carriage and, having considerable length, will engage a large number of sleepers when depressed during firing. This extended engagement of the shoes with the sleeper will provide a large area of sliding contact to transmit the forces of the gun recoil to the sleepers, the frictional contact also tending to dissipate such forces.

In this example the longitudinal slide blocks or shoes E are arranged in pairs underneath the carriage girder A in such a manner that each pair comprises between its two components one of the track rails D when the sliding shoes have been brought into contact with the sleepers $d$. The components E of each pair of sliding shoes are connected together at their ends by cross stays $E^1$. These cross stays $E^1$ extend transversely of the carriage and are each fixed to the lower elements F, G, of a screw jack similar to those described in our aforesaid earlier patent, and the complementary elements H, I of the screw jacks are carried by the gun carriage girder.

By operating these screw jacks by means of the actuating mechanisms M—L—K the screws I are caused to revolve on their axes so as to raise or lower the nuts G, and thereby correspondingly move the cross stays $E^1$ and the sliding shoes E carried by the latter.

Figs. 3 to 7 illustrate a modification wherein the retractable devices consist of two sliding shoes E which, instead of being fixed to connecting cross stays E¹ carried by the lower elements F, G of the supporting screw jacks, are removably or adjustably attached to the said cross stays by means that permit the shifting of the sliding shoes parallelly to their own longitudinal axes. In this instance the cross stays E¹ extend entirely across the carriage. In this way the sliding shoes can be attached to varying points of the length of the connecting cross stays in such a manner as that one or the other of the longitudinal sliding blocks or shoes shall be capable of being attached at will in a vertical plane passing between the two track rails or in a plane intersecting the arc formed by the inside rail, according to the position of the center of curvature of the firing track.

The longitudinal sliding blocks E are attached, for transport, to connecting cross stays E¹ which serve during the firing, as parts for drawing the sliding shoes along in the longitudinal direction, by means of angle bars $e$ fixed to the said shoes and engaging opposite sides of the cross stays.

For transport, the sliding shoes E are suspended by their upper flanges from hooks Y. These hook jaws are formed each on a nut working on a screw-thread (of the requisite hand) of a spindle $y$. The nuts Y are slidable in a carriage Z which is fixed to a screw $z$ working at one end in a screw-thread 1 formed in a bar 2 having a guideway wherein the carriage Z is adapted to slide. The hook jaws Y are slidable in the carriage Z, and the spindle $y$ is journaled at its ends in the carriage Z.

When the sliding shoes E are suspended for transport as shown in Figs. 5 and 6, it is possible by operating the screw $z$ by means of the crank handle $z^1$, to move the right hand sliding shoe in such a manner as to bring it into a suitable plane. The screw $z$ moves longitudinally in the fixed bar 2, and in rotating in the nut 1 it moves the sliding shoes E along by means of the jaw Y.

When the sliding shoes have been moved into the desired vertical plane, they can be brought into contact with the sleepers $d$ by operating the screw jacks F—G—H—I.

If it be desired to abandon the sliding shoes E on the spot, for maneuvering purposes or for any other reason, it will be sufficient to that end, to move the jaws Y apart and then raise the cross stays E¹. This moving apart of the jaws Y is effected by actuating the crank handle $y^1$ in the requisite direction.

After the firing is ended, the whole combination of the sliding shoes E and connecting cross stays E¹ is raised by suitably operating the screw jacks F—G—H—I, and then the right hand sliding shoe is moved back inward by actuating the respective crank handle $z^1$.

The position of the sliding shoes E shown in Fig. 7 is suitable for firing from the curved track shown in full lines in Figs. 4–4ª. The carriage is supported by wheeled trucks pivoted to the under side of its ends and these trucks must necessarily follow the supporting rails during the travel of the carriage. With the carriage situated on a curved track the pivotal connections between the carriage and trucks coincide with the medial curved line of the supporting rails, but the rigid carriage forms the chord of an arc in the medial line, the altitude of the arc depending on the length of the radius of the curve. With the carriage so placed, particularly if the curve of the rails should be made with a comparatively short radius, the longitudinal shoes E should be positioned to engage the sleepers on the inner side of the curvature of the rails, as shown in full lines in Figs. 4–4ª and in Fig. 7. So positioned the shoes would be more nearly directly below the gun than if positioned to engage the sleepers on the outer side of the curve. With a curve made with a comparatively long radius the shoes could be adjusted to either side of the rails as in a straight track.

When it is desired to fire from a track having its center of curvature on the opposite side, it is advisable to cause the two sliding shoes E to slide in such a manner as to bring them into the position indicated in dot and dash lines in Fig. 4. This sliding is produced by actuating the crank handle $z^1$ in the requisite direction.

What I claim is:

1. A railroad gun carriage provided with trucks for running on a railroad track, a gun mounted on said carriage to be fired therefrom, and a plurality of elongated shoes movably mounted longitudinally of said carriage and movable into position to engage the track sleepers to transmit thereto the forces of the gun recoils by sliding contact with said sleepers to relieve the truck wheels and axles of such forces.

2. A railroad gun carriage provided with trucks for running on a railroad track, a gun mounted on said carriage to be fired therefrom, an elongated shoe movably mounted longitudinally of said carriage, and means for moving said shoe into and out of engagement with the track sleepers to transmit forces of the gun recoil to said sleepers by sliding contact therewith and to relieve the truck wheels and axles of said forces.

3. A railroad gun carriage provided with trucks for running on a railroad track, a gun mounted on said carriage to be fired therefrom, an elongated shoe extending longitudinally of the carriage, and means at each end of the carriage connected with each end of the shoe for moving said shoe into and out of engagement with the track sleepers to transmit forces of gun recoil to said sleepers by sliding contact therewith and to relieve the truck wheels and axles of said forces.

4. A railroad gun carriage provided with trucks for running on a railroad track, a gun mounted on said carriage to be fired therefrom, an elongated shoe extending longitudinally of the carriage, and jacks at each end of the carriage connected with each end of the shoe for moving said shoe into and out of engagement with the track sleepers to transmit forces of gun recoil to said sleepers by sliding contact therewith and to relieve the truck wheels and axles of said forces.

5. A railroad gun carriage provided with trucks for running on a railroad track, a gun mounted on said carriage to be fired therefrom, a stay at each end of the carriage extending transversely across the same, a plurality of elongated shoes extending longitudinally of the carriage and connected at their ends to said stays, and means for moving each stay to move the connected shoes into and out of engagement with the track sleepers to transmit forces of gun recoil to said sleepers by sliding contact therewith and to relieve the truck wheels and axles of said forces.

6. A railroad gun carriage provided with trucks for running on a railroad track, a gun mounted on said carriage to be fired therefrom, a stay at each end of the carriage extending transversely across the same, a plurality of elongated shoes extending longitudinally of the carriage and connected at their ends to said stays, a jack connecting each stay with the carriage and operable to move the stay to move the connected shoes into and out of engagement with the track sleepers to transmit forces of gun recoil to said sleepers by sliding contact therewith and to relieve the truck wheels and axles of said forces.

7. A railroad gun carriage provided with trucks for running on a railroad track, a gun mounted on said carriage to be fired from the same, a stay at each end of the carriage extending transversely across the same, an elongated shoe extending longitudinally of said carriage, adjusting means connecting each end of the shoe with a stay to adjust the shoe along the stays and transversely of the carriage, and means for moving each stay to move the shoe into and out of engagement with the track sleepers to transmit forces of gun recoil to said sleepers by sliding contact therewith and to relieve the truck wheels and axles of said forces.

8. A railroad gun carriage provided with trucks for running on a railroad track, a gun mounted on said carriage to be fired from the same, a stay at each end of the carriage extending transversely across the same, a plurality of elongated shoes extending longitudinally of said carriage, adjusting means connecting each end of each shoe with a stay to adjust the shoes independently of each other along the stays and transversely of the carriage, and means for moving each stay to move the shoes into and out of engagement with the track sleepers to transmit forces of gun recoil to said sleepers by sliding contact therewith and to relieve the truck wheels and axles of said forces.

9. A railroad gun carriage provided with trucks for running on a railroad track, a gun mounted on said carriage to be fired from the same, a stay at each end of the carriage extending transversely across the same, an elongated shoe extending longitudinally of said carriage, a supporting member slidable in the under side of each stay transversely of the carriage, jaws carried by the supporting member for engaging the adjacent end of the shoe, means for moving the supporting member along each stay to adjust the shoe transversely of the carriage, and means for moving each stay to move the shoe into and out of engagement with track sleepers to transmit forces of gun recoil to said sleepers by sliding contact therewith and to relieve the truck wheels and axles of said forces.

10. A railroad gun carriage provided with trucks for running on a railroad track, a gun mounted on said carriage to be fired from the same, a stay at each end of the carriage extending transversely across the same, an elongated shoe extending longitudinally of said carriage, a supporting member slidable in the under side of each stay transversely of the carriage, separable jaws carried by the supporting member for engaging the adjacent end of the shoe and provided with means for separating the jaws to release the shoe from the supporting member, means for moving the supporting member along each stay to adjust the shoe transversely of the carriage, and means for moving each stay to move the shoe into and out of engagement with track sleepers to transmit forces of gun recoil to said sleepers by sliding contact therewith and to relieve the truck wheels and axles of said forces.

In testimony whereof I have signed this specification.

EUGÈNE SCHNEIDER.

Witnesses:
ANDRÉ MOSTICKER,
CHAS. P. PRESSLY.